(12) United States Patent

Holweger et al.

(10) Patent No.: US 9,556,909 B2
(45) Date of Patent: Jan. 31, 2017

(54) METHOD FOR OPERATING A ROLLER BEARING ASSEMBLY, AND ROLLER BEARING DEVICE THEREFOR

(71) Applicant: Schaeffler Technologies GmbH & Co. KG, Herzogenaurach (DE)

(72) Inventors: Walter Holweger, Epfendorf (DE); Marcus Wolf, Herzogenaurach (DE); Frank Walther, Neustadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 290 days.

(21) Appl. No.: 14/376,650

(22) PCT Filed: Jan. 16, 2013

(86) PCT No.: PCT/EP2013/050691
§ 371 (c)(1),
(2) Date: Aug. 5, 2014

(87) PCT Pub. No.: WO2013/117392
PCT Pub. Date: Aug. 15, 2013

(65) Prior Publication Data
US 2015/0030272 A1    Jan. 29, 2015

(30) Foreign Application Priority Data
Feb. 6, 2012    (DE) .................. 10 2012 201 721

(51) Int. Cl.
*F16C 33/66*    (2006.01)
*F16C 19/24*    (2006.01)

(52) U.S. Cl.
CPC ........... *F16C 33/6637* (2013.01); *F16C 19/24* (2013.01); *F16C 33/6674* (2013.01); *F16C 33/6688* (2013.01); *F16C 2326/30* (2013.01)

(58) Field of Classification Search
CPC ....... F16C 33/66; F16C 33/6688; F16C 19/24; F16C 17/14
USPC ............ 184/5.1, 74, 6.23; 384/462, 467–470
See application file for complete search history.

(56) References Cited

U.S. PATENT DOCUMENTS

| | | | | |
|---|---|---|---|---|
| 4,738,336 A * | 4/1988 | Smith | ..................... | F16N 29/02 184/108 |
| 4,758,100 A * | 7/1988 | Guttinger | ................ | F16H 57/04 184/45.1 |
| 4,932,500 A * | 6/1990 | Smith | .................... | F16C 19/163 184/5.1 |
| 5,080,195 A * | 1/1992 | Mizumoto | .......... | F16C 33/6622 184/104.1 |

(Continued)

FOREIGN PATENT DOCUMENTS

WO    2009056123    5/2009

*Primary Examiner* — William E Dondero
*Assistant Examiner* — Mark K Buse
(74) *Attorney, Agent, or Firm* — Volpe and Koenig, P.C.

(57) ABSTRACT

A roller bearing device (1) and to a method for operation thereof, including a roller bearing (2) having roller contacts (6, 7) in contact with a medium and lubricated by the liquid medium (10). In order to improve the lubrication and load capacity of such a medium-lubricated roller bearing (2) while simultaneously improving the biologically compatible behavior, a biologically neutral additive material (13) that thickens the medium is held available in a holding device (14) and metered to the roller contacts (6, 7) on demand.

10 Claims, 2 Drawing Sheets

(56) References Cited

U.S. PATENT DOCUMENTS

| | | | | |
|---|---|---|---|---|
| 5,106,209 A * | 4/1992 | Atkinson | ................ | F16C 33/60 384/462 |
| 5,246,087 A * | 9/1993 | Schipper | ............... | F16L 27/087 184/5 |
| 5,599,100 A * | 2/1997 | Jackson | ............... | C10M 177/00 184/6 |
| 5,711,615 A * | 1/1998 | Stitz | ...................... | F16C 27/045 384/471 |
| 5,878,842 A * | 3/1999 | Rake | ...................... | F16N 29/02 184/108 |
| 6,296,078 B1 * | 10/2001 | Liu | ......................... | F16N 13/02 184/29 |
| 6,994,473 B2 * | 2/2006 | Nishibata | ............... | F16N 37/003 184/7.4 |
| 7,493,799 B1 * | 2/2009 | Discenzo | ................ | F16C 19/52 184/108 |
| 7,625,127 B2 * | 12/2009 | Foti | ...................... | B60C 23/003 152/417 |
| 7,694,699 B2 * | 4/2010 | Lim | ........................ | F16C 17/10 141/5 |
| 7,909,513 B2 * | 3/2011 | Ueno | .................... | F16C 19/163 384/470 |
| 8,360,650 B2 * | 1/2013 | Morales Espejel | . | F16C 33/6692 384/462 |
| 2004/0040789 A1 * | 3/2004 | Rake | ...................... | F16N 29/02 184/6.23 |
| 2006/0159378 A1 * | 7/2006 | Plona | ..................... | F16C 33/58 384/462 |

* cited by examiner

METHOD FOR OPERATING A ROLLER BEARING ASSEMBLY, AND ROLLER BEARING DEVICE THEREFOR

FIELD OF THE INVENTION

The invention relates to a roller bearing device and a method for its operation with a roller bearing with roller contacts in contact with a medium and lubricated by the liquid medium.

BACKGROUND

Roller bearings that are in contact with a medium and are used, for example, in underwater applications, are exposed to continuous loads with the medium—here water—so that conventional roller contacts treated with synthetic or mineral lubricants are quickly washed away. Washing away such lubricants causes environmental problems, such as, environmental contamination due to eutrophication and the lack of biodegradability, especially for frequent or long-term use. To counteract the rapid loss of lubricant, dynamic seals of the intermediate space that is between the outer ring and inner ring and contains the roller contacts have been proposed in which a sealing unit is locked in rotation to the outer ring and inner ring on each side of the roller bearing and is sealed dynamically by means of a seal, for example, a lip seal. Here, moments of friction occur that adversely affect the efficiency of the roller bearing and thus of the application using the roller bearing.

Alternatively it is proposed to design roller bearings such that water acts as a lubricating medium. Here, very corrosion-resistant materials are required, especially in seawater environments. The load capacity of roller contacts lubricated only with water is comparatively low. Furthermore, so-called fouling must be taken into account, in which the roller contacts are obstructed with calcium-depositing microorganisms, wherein the roller contacts are permanently damaged.

SUMMARY

The object of the invention is thus to refine a roller bearing for improving medium-supported lubrication by the medium, in particular, water.

The objective is met by a method for operating a roller bearing device with a roller bearing with roller contacts that are in contact with a medium and are lubricated by the liquid medium, in particular, water, wherein a biologically neutral additive that thickens the medium is stored in a supply device and dosed as needed to the roller contacts.

Through the use of a biologically neutral additive that thickens the medium, such as water, the thickening of the medium improves the tribological effect of the medium that is made functional in this way, so that the load capacity of the roller contacts can be increased for the same rolling surface area. Furthermore, a medium that is made functional and rinsed out due to high medium pressure and/or medium flow can be replaced by the controlled dosing of additive. For the biologically neutral additive, this is an individual component, such as a gel or the like, or a mixture made from a thickener and corresponding additives. The additive is, in particular, biocompatible, preferably 100% biodegradable, and non-eutrophic. For example, thickeners can be degradable and non-eutrophic. For example, thickeners such as modified cellulose, amino acids, and the like could be used. This produces advantageous uses for water turbines, for example, current power generators, paper machines, food processing machines, agricultural devices, devices in the chemical and pharmaceutical industries, applications in ships, for example, on stern tubes, in military engineering, and the like.

Through the use of additives in connection with the medium, only a small quantity of additive, such as a thickener, is needed to achieve a desired lubricating effect for a specified tribological effect and load capacity, so that materials and costs are saved. Additives having a wear and/or corrosion reducing effect can be provided, so that, for example, long-term use in especially pure to heavily polluted fresh water and also, in particular, sea water, is possible.

According to one advantageous construction of the method, a dosing of the additive is controlled by a control parameter detected by means of a detection device mounted in the area of the roller contacts for detecting the viscosity of the medium. For example, a quartz viscometer can be arranged in the area of the rolling surfaces on a roller body cage or a stationary raceway, depending on the application on the outer or inner ring. This viscometer determines the viscosity of the composition of the medium and additive active on the roller contacts, such as the rolling surfaces, and doses additive by means of one or more dosing openings to the roller contacts, for example, by controlling a valve, such as an electrical proportional valve or the like, as a function of the viscosity converted into a control parameter, for example, an electrical signal. Here, the additive stored in the supply device, for example, a storage container arranged within or preferably outside of the medium, can be pressurized by the force of gravity or by means of preloading by a feed pump.

Alternatively or additionally, the dosing of additive can be controlled by a control parameter detected by means of a detection device mounted in the area of the roller contacts for detecting a fill level of a reservoir connected to the roller contacts. Here, the fill level of the reservoir, for example, of a channel or cavity connected directly to a roller contact and bounded by this roller contact can be detected visually or by detecting the pressure, an electrical resistance, by in some other way.

To reduce the contact of the medium on the contact surfaces, a free blowing device operated with compressed air can be provided on the side of the roller contacts opposite the dosing of the additive. This free blowing device places a gaseous cushion preferably from compressed air in front of the roller contacts, so that contact with the medium is reduced and therefore the discharge of medium made functional with the additive is at least reduced. This can further reduce the consumption of additive.

The problem is further solved by a roller bearing device for performing the proposed method. Here, a roller bearing is provided with an inner ring, an outer ring, and roller bodies that are distributed over the circumference between these rings and roll on the roller contacts of these rings, wherein for thickening the medium, in particular, water, present on the roller bodies, a supply device with the additive that thickens the medium and a dosing device that doses the additive to the roller contacts as a function of a control parameter detected by a detection device are provided.

According to one advantageous embodiment, the roller bearing device contains a dosing device with a feed pump preloading the additive in the supply device, a valve that can be switched as a function of the control parameter, and at least one dosing opening in the area of the roller contacts.

The detection device can be, for example, a viscometer, a fill level sensor detecting a fill level of a reservoir for the additive arranged on the roller contacts, or the like.

A free blowing device can be provided on the side of the roller bearing opposite the dosing device.

BRIEF DESCRIPTION OF THE DRAWINGS

The invention is described in more detail with reference to embodiments shown in FIGS. 1 to 3. Shown are.

DETAILED DESCRIPTION OF THE PREFERRED EMBODIMENTS

Figure 1:
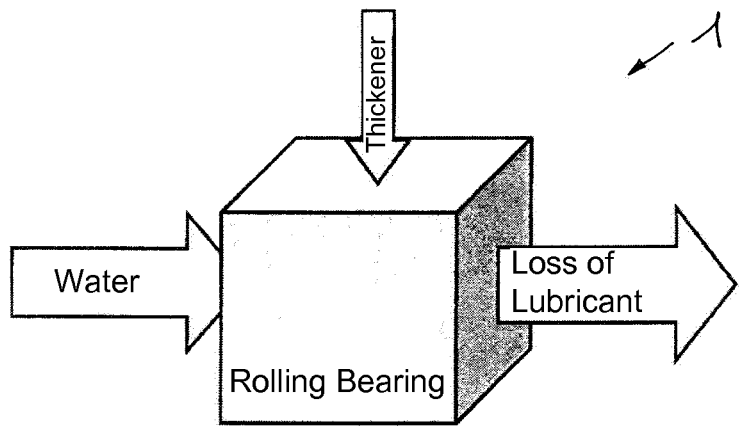
FIG. 1 a schematic diagram showing the function of a roller bearing device.

FIG. 1 shows, as a block diagram, the schematic function of a roller bearing device 1 in an environment with a medium—here, water. Through the entry of water into the roller bearing, lubricant is discharged. To balance the loss of lubricant with the smallest possible input of material and to maintain it at least neutral ecologically for the environment, the water that is present is made functional by adding small quantities of additive—here, thickener—that forms the lubricant with the water by increasing the viscosity of the water. In this way, the dosing of the thickener can be kept at low quantities. For an appropriate composition of the thickener from a single component or a mixture of several individual components, the water that is made functional by means of the thickener can assume lubricating properties, for example, at the quality of ISO VG 220. Here the thickener can contribute 5 vol. % to the total volume of the lubricant and the water provides the remaining 95 vol. %. Here, both the thickener itself and also the lubricant that is optionally converted with a chemical reaction and/or formed using a physically associative method are preferably 100% biodegradable, non-eutrophic, and environmentally compatible. Chemical compounds or their mixtures, such as modified cellulose, amino acids, and the like, which form a lubricant of higher viscosity, for example, with hydrophilic media, can be used as the thickener. If necessary, additives, such as anti-corrosion components that are preferably also biologically neutral can be added to the thickener.

It can be used, in particular, in temperatures from −20° C. to 100° C., under pressure, or appropriate media loading up to 120° C. and is suitable, in particular, for current power generators, such as ocean current power generators, tidal energy power generators, and the like, due to their high tolerance to salt water.

Figure 2:
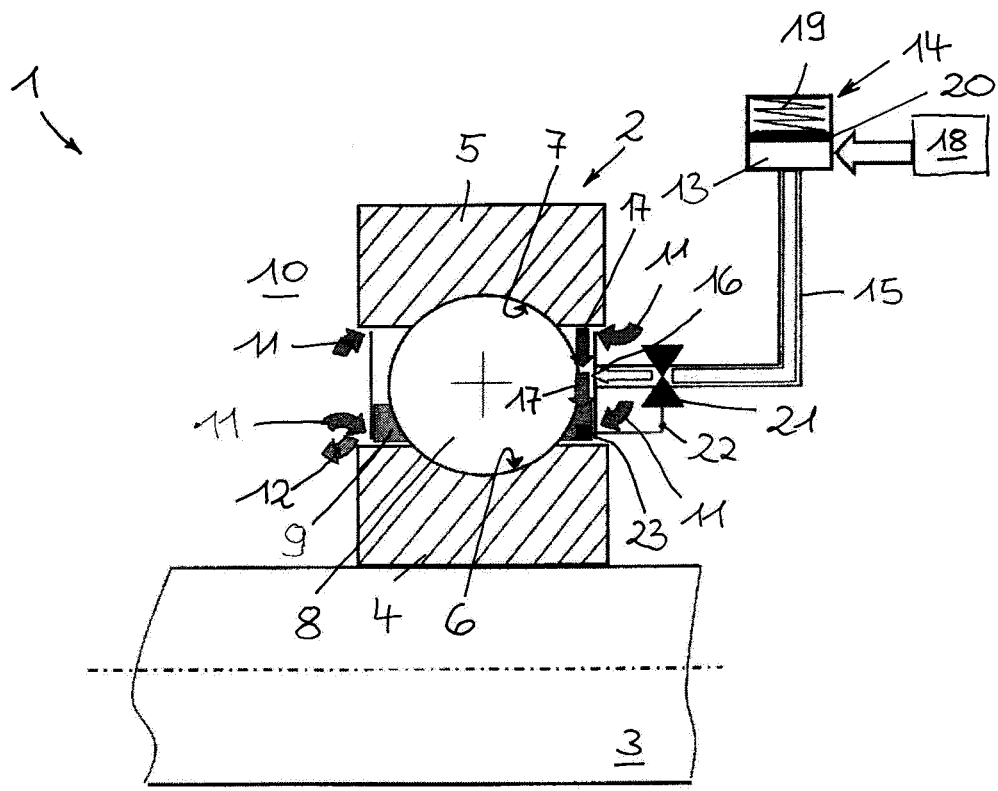
FIG. 2 a schematic diagram of a roller bearing device.

FIG. 2 shows the roller bearing device 1 of FIG. 1 schematically in detail. The roller bearing 2 arranged around the shaft 3 with the inner ring 4, the outer ring 5, and the roller bodies 8 mounted in the bearing cage 9 distributed over the circumference between these rings and rolling on the roller contacts 6, 7 has an open design relative to the medium 10, such as water. In this way, lubricant—symbolized by the arrow 12—is discharged to the roller bearing 2 as a function of the prevailing flow of the medium 10 shown by means of the arrows 11.

The lubricant not shown in detail here is formed on site from the medium 10 fed into the roller bearing 2 and the additive 13, such as a thickener that is stored in the supply device 14 and dosed into the area of the roller contacts 6, 7 by means of the dosing opening 16 via the pressurized line 15. Due to the flow of medium and the turbulence symbolized by the arrows 17 due to the rotating roller bearing 2, the additive 13 and medium 10 are mixed together and a lubricant is produced that forms a lubricating film on the roller contacts 6, 7.

To compensate the discharged lubricant, dosing of the additive 13 is provided. For this purpose, the additive 13 is dosed by means of the feed pump 18, the preloading spring 19 that preloads the piston 20 of the supply device 14 and/or the like, and by means of the dosing valve 21. The dosing valve 21 is included in the control loop 22 and opens when the detection device 23 detects a viscosity of the lubricant less than a specified threshold. The detection device can be, for example, a quartz viscometer that outputs, as a function of the viscosity, an electrical control parameter that is evaluated in a control unit containing the control loop 22, wherein this controls the dosing valve 21.

Figure 3:
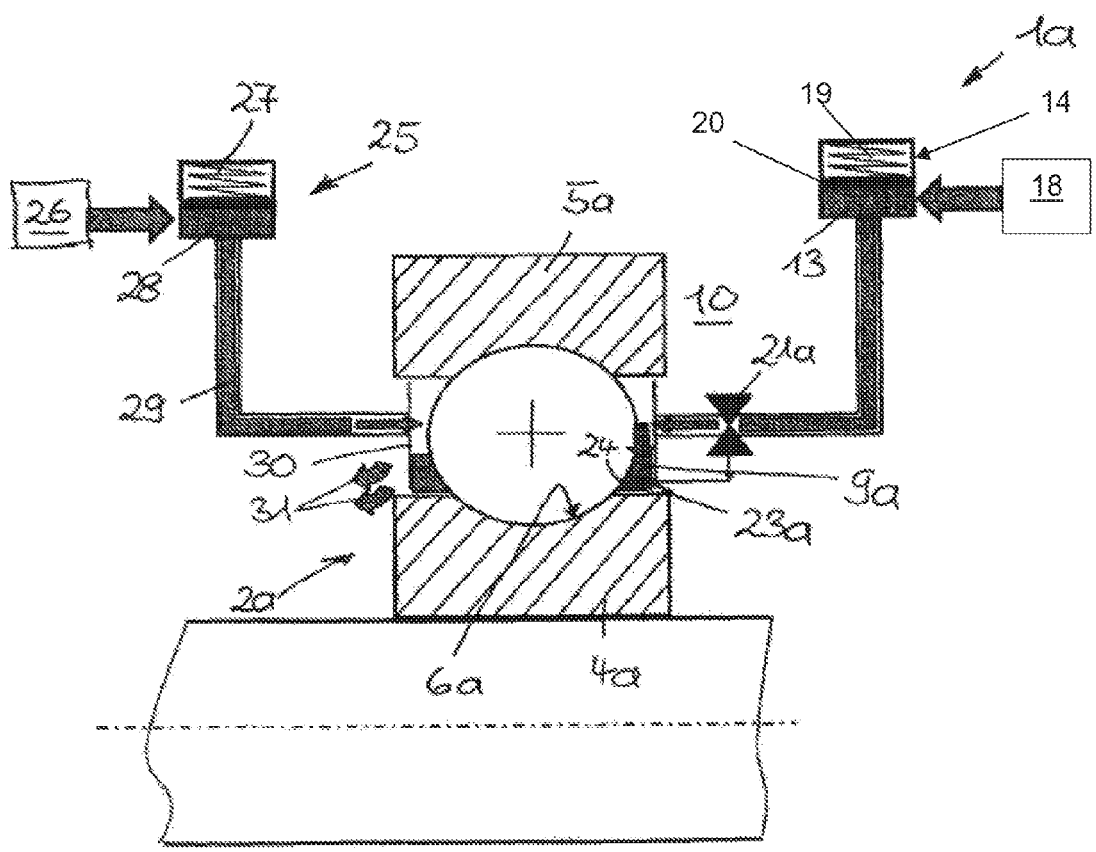
FIG. 3 a schematic diagram of a roller bearing device modified relative to the roller bearing device of FIG. 2.

FIG. 3 shows a modification of the roller bearing device 1 of FIG. 2 in the form of the roller bearing device 1a in a schematic diagram. In contrast to the detection device 23 of FIG. 2, the detection device 23a detects a fill level of a reservoir 24, for example, in the form of a channel or a cavity in the bearing cage 9a that is in contact with the roller contact 6a. Due to the presence of the medium 10, the lubricant is produced continuously with the additive 13 discharged from the reservoir 24 and the medium 10. If the fill level of the additive 13 in the reservoir falls below a specified threshold, the dosing valve 21a is opened and additive 13 is added.

Another difference is the free blowing device 25 that can also be used in the roller bearing device 1 of FIG. 2. The free blowing device 25 contains the pressurized volume 28 that is preloaded, for example, by means of the pressure pump 26 and stabilized by the preloading spring 27 and filled with gas, such as pressurized air and blows, continuously or intermittently, the preloaded gas via the pressurized line 29 onto the end side facing away from the end side that has the dosing device for the additive, so that the intermediate space 30 between the inner ring 4a and outer ring 5a of the roller bearing 2a is freely blown with the medium 10 symbolically in the direction of the arrows 31. Due to the only reduced medium 10 in the intermediate space 30, the flushing of lubricant is reduced, so that the consumption of additive 13 can be further restricted.

LIST OF REFERENCE NUMBERS

1 Roller bearing device
1a Roller bearing device
2 Roller bearing
2a Roller bearing
3 Shaft
4 Inner ring
4a Inner ring
5 Outer ring
5a Outer ring
6 Roller contact
6a Roller contact
7 Roller contact
8 Roller body
9 Bearing cage
9a Bearing cage
10 Medium
11 Arrow
12 Arrow
13 Additive
14 Supply device 15 Pressurized line
16 Dosing opening
17 Arrow
18 Feed pump
19 Preloading spring
20 Piston
21 Dosing valve
21a Dosing valve
22 Control loop
23 Detection device
23a Detection device
24 Reservoir
25 Free blowing device
26 Pressure pump
27 Preloading spring
28 Pressure volume
29 Pressurized line
30 Intermediate space
31 Arrow

The invention claimed is:

1. A method for operating a roller bearing device comprising providing a roller bearing with roller contacts that are in contact with a liquid medium and are lubricated by the liquid medium, storing a biologically neutral additive that thickens the liquid medium in a supply device, and dosing the biologically neutral additive as needed to the roller contacts, wherein the liquid medium is water.

2. The method according to claim 1, wherein the dosing of the biologically neutral additive is controlled by a control parameter detected by a detection device mounted in an area of the roller contacts for detecting a viscosity of the liquid medium.

3. The method according to claim 1, wherein the dosing of the biologically neutral additive is controlled by a control parameter detected by a detection device mounted in an area of the roller contacts for detecting a fill level of a reservoir connected to the roller contacts.

4. A roller bearing device for performing the method according to claim 1, comprising the roller bearing having an inner ring, an outer ring, and roller bodies that are distributed over a circumference between the inner ring and the outer ring and roll on the roller contacts of the rings, the supply device with the biologically neutral additive that thickens the liquid medium and a dosing device that doses the biologically neutral additive to the roller contacts as a function of a control parameter detected by a detection device.

5. The roller bearing device according to claim 4, wherein the dosing device contains a feed pump preloading the biologically neutral additive in the supply device, a dosing valve that is switchable as a function of the control parameter, and at least one dosing opening in an area of the roller contacts.

6. The roller bearing device according to claim 4 wherein the detection device is a viscometer.

7. The roller bearing device according to claim 4, wherein the detection device is a fill level sensor detecting a fill level of a reservoir that is provided for the biologically neutral additive and is arranged on the roller contacts.

8. The roller bearing device according to claim 4, wherein the biologically neutral additive is biocompatible, biodegradable, and non-eutrophic.

9. A method for operating a roller bearing device comprising providing a roller bearing with roller contacts that are in contact with a liquid medium and are lubricated by the liquid medium, storing a biologically neutral additive that thickens the liquid medium in a supply device, and dosing the biologically neutral additive as needed to the roller contacts, wherein a free blowing device operated with compressed air is provided on a side of the roller contacts opposite the dosing of the biologically neutral additive.

10. A roller bearing device for performing the method according to claim 1, comprising the roller bearing having an inner ring, an outer ring, and roller bodies that are distributed over a circumference between the inner ring and the outer ring and roll on the roller contacts of the rings, the supply device with the biologically neutral additive that thickens the liquid medium and a dosing device that doses the biologically neutral additive to the roller contacts as a function of a control parameter detected by a detection device, wherein a free blowing device is provided on a side of the roller bearing opposite the dosing device.

* * * * *